E. BEAUPRÉ.
SWITCH POINT CONTROLLER.
APPLICATION FILED AUG. 31, 1914.
1,139,749.
Patented May 18, 1915.
2 SHEETS—SHEET 1.
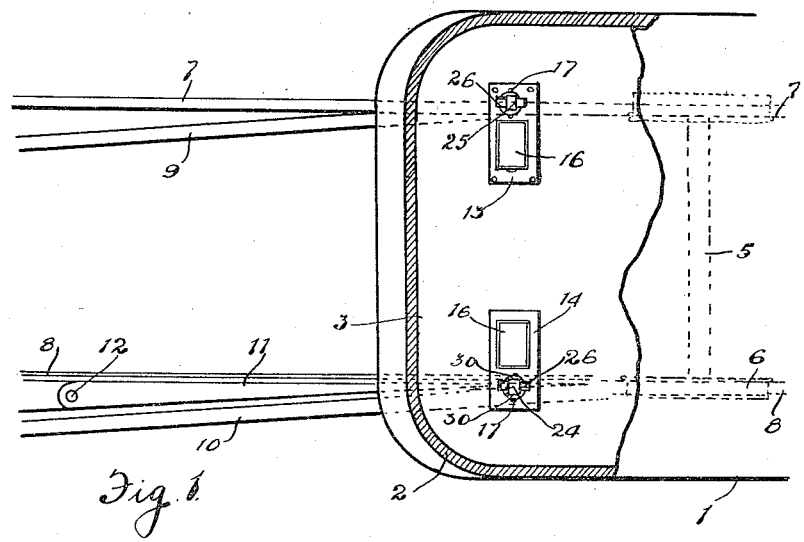
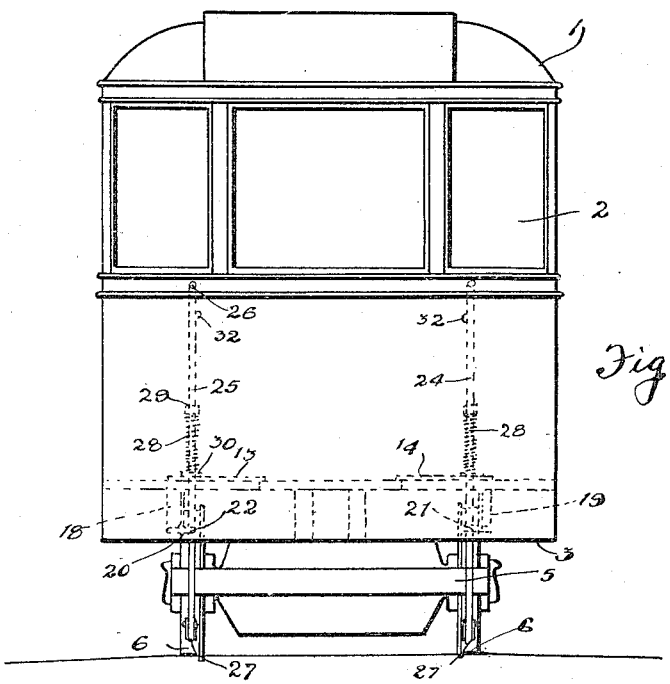
WITNESSES
Roland Foster
J. M. Sapley
INVENTOR
E. Beaupré
By Fred S. Felustinlangh Attorney.

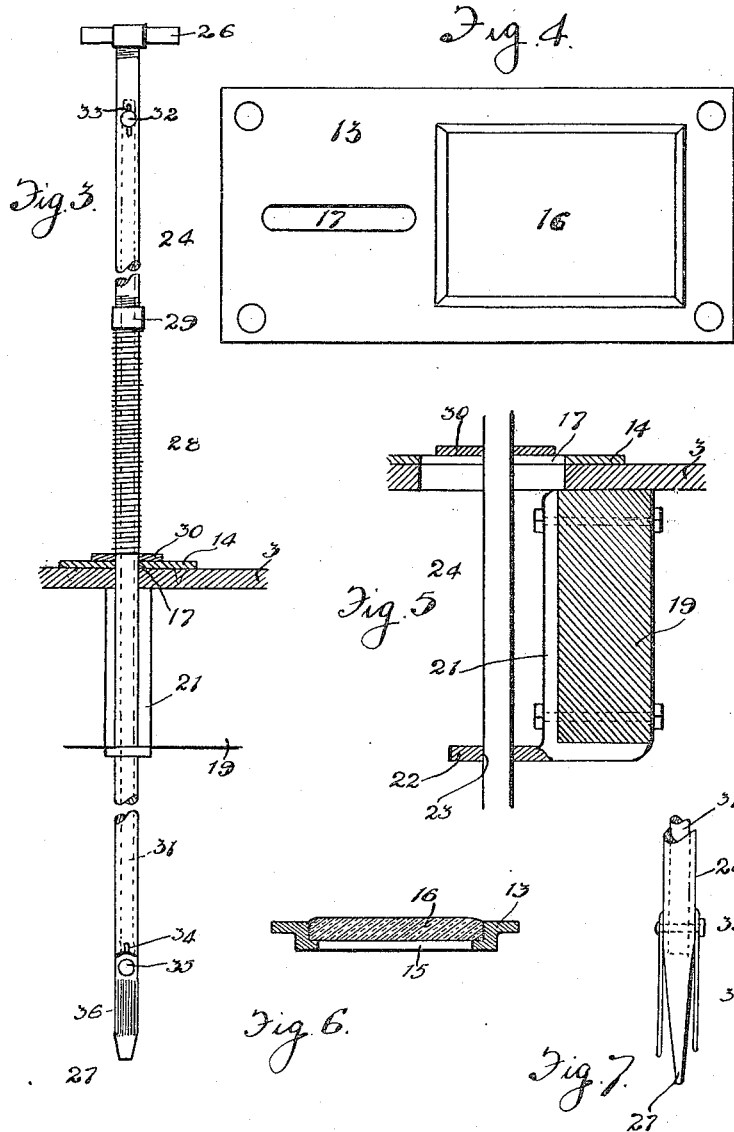

UNITED STATES PATENT OFFICE.

ELZEAR BEAUPRÉ, OF ST. BONIFACE, MANITOBA, CANADA.

SWITCH-POINT CONTROLLER.

1,139,749.   Specification of Letters Patent.   Patented May 18, 1915.

Application filed August 31, 1914. Serial No. 859,353.

*To all whom it may concern:*

Be it known that I, ELZEAR BEAUPRÉ, of the city of St. Boniface, in the Province of Manitoba, Canada, have invented certain new and useful Improvements in Switch-Point Controllers, of which the following is the specification.

The invention relates to a switch point controller and the object of the invention is to provide a device attachable to a car whereby a switch point can be thrown by the motorman without necessitating leaving the car.

A further object of the invention is to provide a device whereby the rails adjoining the switch can be kept clear of foreign material such as snow, this also being effected by the motorman within the car vestibule.

With the above objects in view the invention consists essentially in a hollow upright shaft or pipe supplied with a hand piece and having the lower end flattened, said pipe protruding through the vestibule floor and being suitably supported from the floor, a broom or whisk located in the lower end of the pipe, means controlled from the car vestibule for adjusting the whisk and a sight opening in the vestibule floor, the parts being arranged and constructed as hereinafter more particularly described and later pointed out in the appended claims.

Figure 1 represents a plan view of the device as applied on a car, the roof of the car being torn away to expose construction. Fig. 2 represents a front elevation of a car equipped with my invention. Fig. 3 represents an enlarged detailed side view of the pipe and adjoining parts, the floor being shown in vertical section. Fig. 4 is a plan view of the plate. Fig. 5 is an enlarged detailed vertical sectional view through the car floor and one of the supporting beams, the hanger and a portion of the pipe being shown in side elevation. Fig. 6 is a cross sectional view through the plate and glass carried thereby. Fig. 7 is a side view of the lower end of the rod and attached whisk.

In the drawings like characters of reference indicate corresponding parts in each figure.

1 represents a car of which 2 is the vestibule and 3 the vestibule floor. The car is supported in the usual manner on trucks 5 having the wheels 6 thereof riding on the main line rails 7 and 8. 9 and 10 represent side rails and 11 represents a switch point for directing the car either to the side or straight through on the main line. The above parts are all of ordinary construction and are not herein detailed as they are well understood. It is here mentioned however that the switch point is swung on the pivot pin 12. A portion of the vestibule floor is cut away at each side to admit the plates 13 and 14, which plates are supplied with sight openings 15 fitted with heavy glass 16. Adjoining the glass in each plate is a slot 17 for a purpose later described.

The side beams 18 and 19 of the car support hangers 20 and 21 which are securely bolted to the beams and are fitted with offset arms 22 provided with vertically disposed openings 23 alined centrally directly beneath the slots 17.

The plates and hangers form the support for the switch controlling hollow shafts or pipes 24 and 25 now described. I have placed one of these pipes or shafts at each side of the car so that either a right or a left hand switch point can be thrown but I am only describing one of them in detail as it is to be understood that the other of them is constructed and suspended in an identical manner.

The upper end of each pipe is supplied with a hand piece 26 and the lower end is flattened and brought to an edge as indicated at 27, the sides being slightly tapered so that the lower end actually has an appearance much the same as the screwing end of a screwdriver.

The body of each pipe passes through the slot 17 and through the opening 23 and it is supported normally in an upright position by a spiral spring 28 enveloping a portion of the pipe and having the upper end butted against a permanent collar 29 carried by the pipe and the lower end bearing on a washer 30 mounted on the face of the plate 13 or 14 as the case may be and covering the slot 17 therein. This particular arrangement allows the motorman within the vestibule to swing the lower end of the pipe or shaft in any lateral direction and also permits him to force it down as desired, the spring collapsing during the operation.

31 is a rod slidably mounted in each pipe and held in any adjusted position within the pipe by an adjusting screw 32 passing into the upper end of the rod through a suitable slot 33 formed in the pipe. The lower end of the pipe is also slotted at 34 to receive the bolt 35 which passes into and through the lower end of the rod and supports the brush or whisk 36 which surrounds end 27 of the pipe. I prefer to form this brush from sheet metal cut into narrow strips as indicated.

With this device applied on a car the motorman when approaching a switch can stop or slow down his car and when looking through the sight openings, can depress the pipe to pass the lower end 27 thereof to the side of the switch point which he can swing to pass the car either on the siding or directly through on the main line.

In countries where snow and other such foreign material is apt to collect in the switch the whisk operates to sweep this out provided the pipe is held down. When it is not required the whisk can be raised clear of the lower end of the pipe by undoing the adjusting screw 32 and raising the rod.

For convenience in operating at night it is suggested that an electric light could be placed on the under side of the car to light the switch when the car approaches.

What I claim as my invention is:—

1. The combination with the floor of a car provided with a suitable sight opening, of a slotted plate located in the floor of the car, the slot passing in a direction across the floor, a hanger suspended beneath the floor of the car and fitted with an offset arm provided with an opening located vertically beneath the slot, a vertically disposed shaft passing through the slot and opening, said shaft having the lower end thereof flattened and the upper end thereof provided with a suitable hand piece and a spring enveloping the shaft and suspending the same from the floor, as and for the purpose specified.

2. The combination with the floor of a car provided with a suitable sight opening, of a plate located in the car floor adjoining the sight opening and provided with a slot passing in a direction across the car, a hanger located beneath the floor and provided with an offset arm having an opening therein located beneath the slot, a vertically disposed shaft passing through the slot and opening and having the lower end thereof flattened and the upper end thereof provided with a hand piece, a washer on the shaft and playing over the slot, a collar fixed on the shaft at a point above the floor and a spiral spring enveloping the shaft and located between the washer and the collar, as and for the purpose specified.

3. The combination with the floor of a car having a portion thereof cut away, of a plate covering the opening and provided with a sight opening and a slot, the slot passing in a direction across the car, a hanger secured to the under side of the car and fitted with an offset arm provided with an opening alined with the slot, a vertically disposed shaft passing through the slot and the opening, said shaft having the lower end thereof flattened and the upper end thereof provided with a hand piece, a washer on the shaft and playing over the slot, a collar on the shaft and within the car and a spiral spring enveloping the shaft and inserted between the collar and the washer, as and for the purpose specified.

4. The combination with the floor of a car having a portion thereof cut away, of a plate covering the opening in the floor and provided with a sight opening and a slot, the slot passing in a direction across the car, a hanger secured to the under side of the car and fitted with an offset arm provided with an opening alined with the slot, a vertically disposed hollow shaft passing through the slot and the opening and having the lower end thereof flattened and the upper end thereof provided with a hand piece, a washer on the shaft and playing over the slot, a collar on the shaft above the floor, a spiral spring enveloping the shaft and bearing against the collar and the washer, an adjustable rod located within the hollow center of the shaft and bearing against the collar and the washer, and a brush located on the flattened end of the shaft and secured to the lower end of the rod, as and for the purpose specified.

5. The combination with the floor of a car having a portion thereof cut away, of a plate covering the opening and provided with a sight opening and a slot, the slot passing in a direction across the car, a hanger secured to the under side of the car and fitted with an offset arm provided with an opening alined with the slot, a vertically disposed shaft passing through the slot and the opening, said shaft having the lower end thereof flattened and the upper end thereof provided with a hand piece, a washer on the shaft and playing over the slot, a collar on the shaft and within the car, a spiral spring enveloping the shaft and inserted between the collar and the washer and an adjustable brush located on the lower or flattened end of the shaft, as and for the purpose specified.

6. The combination with the floor of a car having a portion thereof cut away, of a plate covering the opening and provided with a sight opening and a slot, the slot passing in a direction across the car, a hanger secured to the under side of the car, and fitted with an offset arm provided with an opening alined with the slot, a vertically disposed shaft passing through the slot and the opening, said shaft having the lower end thereof flattened and the upper end thereof provided with a hand piece, a washer on the shaft and playing over the slot, a collar on the shaft and within the car, a spiral spring enveloping the shaft and inserted between the collar and the washer and an adjustable brush located at the lower or flattened end of the shaft, said brush being manipulated from the interior of the car, as and for the purpose specified.

7. The combination with the floor of a car having a portion thereof cut away, of a plate covering the opening in the floor and provided with a sight opening and a slot, the slot passing in a direction across the car, a hanger secured to the under side of the car and fitted with an offset arm provided with an opening alined with the slot, a vertically disposed hollow shaft passing through the slot and the opening and having the lower end thereof flattened and the upper end thereof provided with a hand piece, a washer on the shaft and playing over the slot, a collar on the shaft and bearing against the collar and the washer, a rod slidably received within the hollow shaft, an adjusting screw engaging with the upper end of the rod, a bolt carried by the lower end of the rod, said bolt having the ends thereof protruding through alined vertically disposed slots located in the lower end of the shaft and a brush at the lower end of the shaft and carried by the bolt, as and for the purpose specified.

Signed at Winnipeg this 8th day of July 1914.

ELZEAR BEAUPRÉ.

In the presence of—
G. S. ROXBURGH,
S. GOULD.

Copies of this patent may be obtained for five cents each, by addressing the "Commissioner of Patents, Washington, D. C."